(12) United States Patent
Moon et al.

(10) Patent No.: US 8,626,657 B2
(45) Date of Patent: Jan. 7, 2014

(54) MOBILE TERMINAL AND CONTROL METHOD THEREOF

(75) Inventors: Kyungjin Moon, Seoul (KR); Huran Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/357,953

(22) Filed: Jan. 25, 2012

(65) Prior Publication Data

US 2012/0317023 A1     Dec. 13, 2012

(30) Foreign Application Priority Data

Jun. 10, 2011 (KR) .................. 10-2011-0056392

(51) Int. Cl.
- G06Q 40/00 (2012.01)
- G06Q 30/00 (2012.01)
- G06Q 20/00 (2012.01)

(52) U.S. Cl.
USPC .................. 705/41; 705/44; 705/65; 705/346

(58) Field of Classification Search
None
See application file for complete search history.

(56) References Cited

U.S. PATENT DOCUMENTS

| | | | |
|---|---|---|---|
| 7,627,904 B2 * | 12/2009 | Tokkonen | 726/27 |
| 2006/0047576 A1 * | 3/2006 | Aaltonen et al. | 705/26 |
| 2008/0004888 A1 * | 1/2008 | Davis et al. | 705/1 |
| 2008/0070593 A1 | 3/2008 | Altman et al. | |
| 2008/0133336 A1 * | 6/2008 | Altman et al. | 705/10 |
| 2009/0061831 A1 | 3/2009 | Shastry | |
| 2010/0280956 A1 * | 11/2010 | Chutorash et al. | 705/64 |
| 2011/0029399 A1 * | 2/2011 | Asher et al. | 705/26.1 |
| 2011/0047075 A1 * | 2/2011 | Fourez | 705/44 |
| 2011/0208545 A1 * | 8/2011 | Kuester | 705/4 |
| 2011/0214143 A1 * | 9/2011 | Rits et al. | 725/34 |
| 2011/0246284 A1 * | 10/2011 | Chaikin et al. | 705/14.38 |
| 2011/0282785 A1 * | 11/2011 | Chin | 705/42 |
| 2012/0173425 A1 * | 7/2012 | Jeong | 705/44 |
| 2012/0191603 A1 * | 7/2012 | Nuzzi | 705/40 |
| 2012/0191614 A1 * | 7/2012 | Babitch et al. | 705/71 |
| 2012/0197691 A1 * | 8/2012 | Grigg et al. | 705/14.1 |
| 2012/0197743 A1 * | 8/2012 | Grigg et al. | 705/16 |
| 2012/0197773 A1 * | 8/2012 | Grigg et al. | 705/35 |
| 2012/0209768 A1 * | 8/2012 | Nuzzi | 705/44 |
| 2012/0221463 A1 * | 8/2012 | Nuzzi | 705/39 |
| 2012/0246074 A1 * | 9/2012 | Annamalai et al. | 705/44 |
| 2012/0278201 A1 * | 11/2012 | Milne | 705/26.41 |

FOREIGN PATENT DOCUMENTS

| | | |
|---|---|---|
| EP | 2 287 792 | 2/2011 |
| WO | WO 02/060209 | 8/2002 |

OTHER PUBLICATIONS

European Search Report for Application 12151453.3 dated Sep. 17, 2012.

* cited by examiner

*Primary Examiner* — Gregory Johnson
(74) *Attorney, Agent, or Firm* — KED & Associates LLP

(57) ABSTRACT

A mobile terminal and a control method of the mobile terminal may be provided. The mobile terminal may include a short range communication module, a memory for storing information regarding a payment method, and a controller for making a payment using a payment method corresponding to a location at which a communication link is set, based on the information regarding a payment method.

26 Claims, 35 Drawing Sheets

FIG. 21A

|  | Pass word |
|---|---|
| Master card | ABCD |
| Shinhan card | EFGH |
| Visa card | IJKL |
| LG card | MNOP |

MOBILE TERMINAL AND CONTROL METHOD THEREOF

CROSS-REFERENCE TO RELATED APPLICATION

This application claims benefit and priority from Korean Patent Application No. 10-2011-0056392, filed Jun. 10, 2011, the subject matter of which is hereby incorporated by reference.

BACKGROUND

1. Field

Embodiments may relate to a mobile terminal and a control method of a mobile terminal.

2. Background

As functions of terminals such as personal computers, laptop computers, cellular phones diversify, the terminals may become multimedia players having multiple functions for capturing pictures or moving images, playing music, moving image files and games and/or receiving broadcasting programs.

Terminals may be mobile terminals and/or stationary terminals. The mobile terminals may be handheld terminals and/or vehicle mount terminals according to whether users may personally carry the terminals. Terminals including mobile terminals may provide an increased number of complex and various functions.

BRIEF DESCRIPTION OF THE DRAWINGS

Arrangements and embodiments may be described in detail with reference to the following drawings in which like reference numerals refer to like elements and wherein:

FIGS. 18A-18B, 19A-19B, 20A-20B, 21A-21B and 22 show a payment process of the mobile terminal (shown in FIG. 12).

DETAILED DESCRIPTION

Arrangements and embodiments may be described more fully with reference to accompanying drawings, in which exemplary embodiments may be shown. Embodiments may, however, be embodied in many different forms and should not be construed as being limited to embodiments set forth herein; rather, embodiments may be provided so that this disclosure may be thorough and complete, and will fully convey the concept to those skilled in the art.

A mobile terminal may be described below with reference to the accompanying drawings. In the following description, suffixes "module" and "unit" are given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
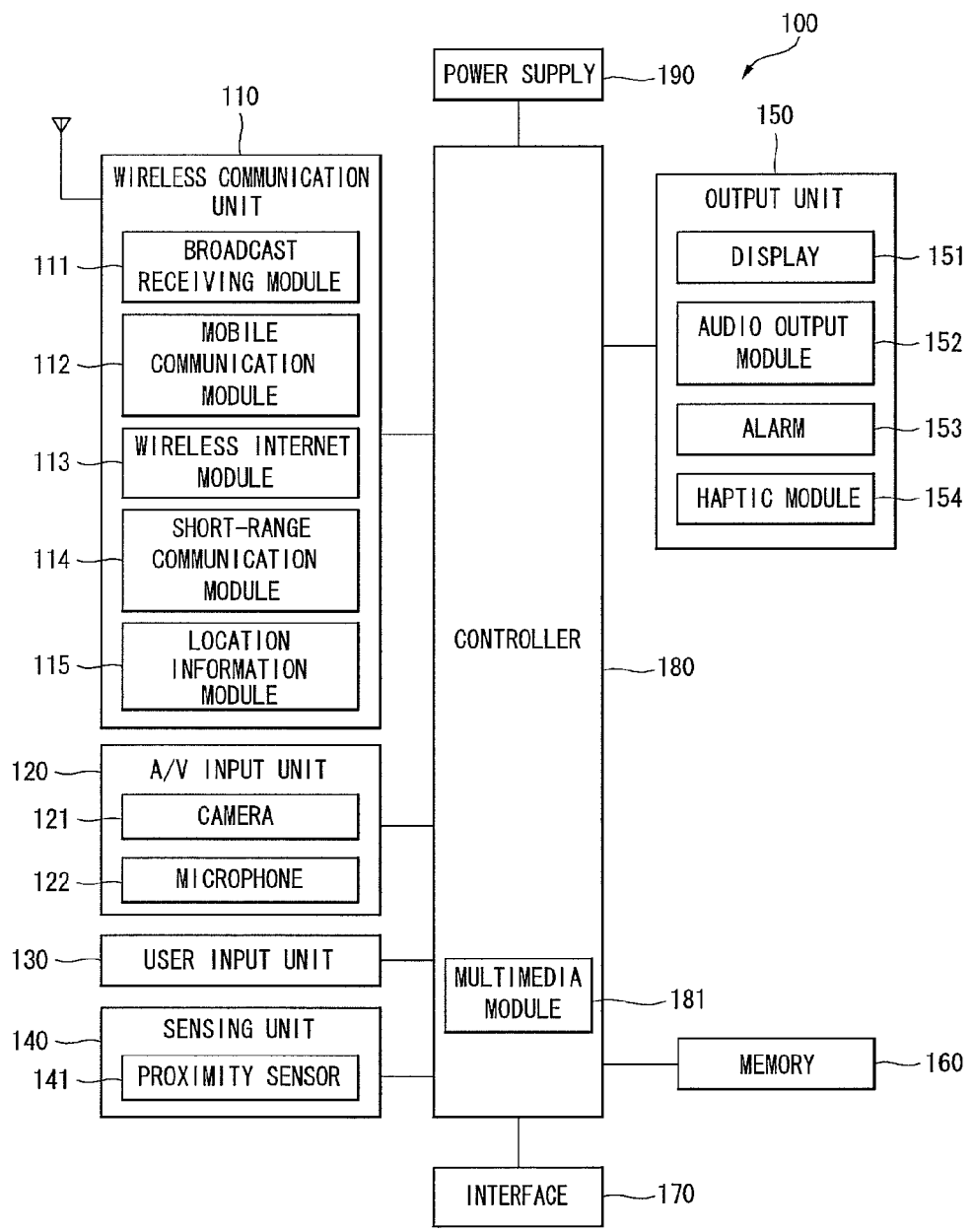
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (NV) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short-range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and/or a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short-range communication module 114 may correspond to a module for local area communication. Further, Bluetooth®, radio frequency identification (RFID), infrared data association (IrDA), ultra wideband (UWB) and/or ZigBee® may be used as a local area communication technique.

The location information module 115 may confirm or obtain a location or position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and/or a quasi-zenith satellite system (QZSS) of Japan, for example.

A global positioning system (GPS) module 115 is a representative example of the location information module 115. The GPS module 115 may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module 115 may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may include a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. A proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user may feel. One example of the haptic effect is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FP-GAs), processors, controllers, micro-controllers, microprocessors, and/or electrical units for executing functions. Embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
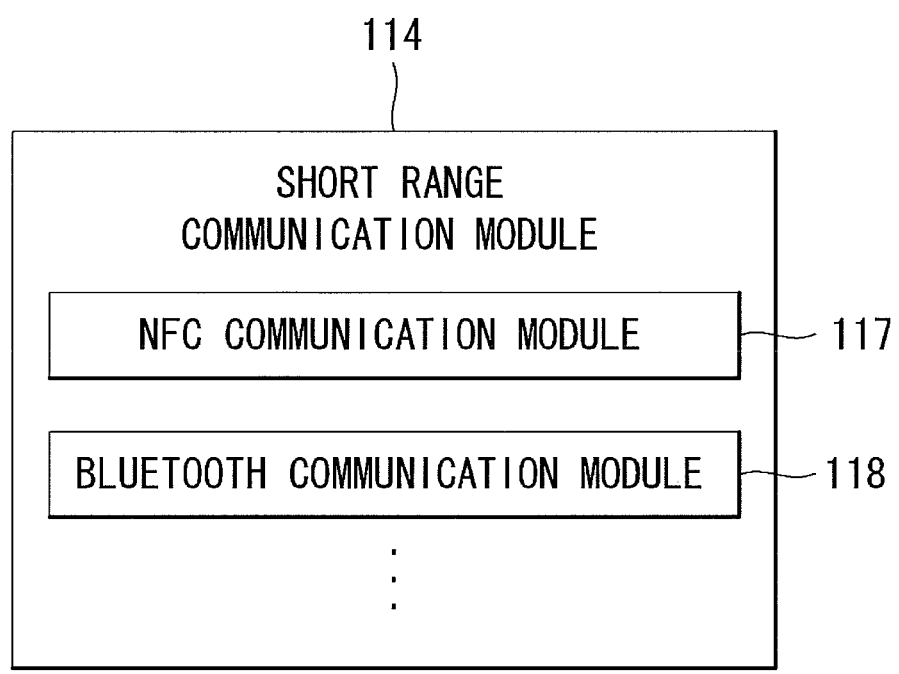
FIG. 2 is a block diagram of a short range communication module of a mobile terminal according to an embodiment.

FIG. 2 is a block diagram of a short range communication module of a mobile terminal according to an embodiment. As shown in FIG. 2, the short range communication module 114 may include a Near Field Communication (NFC) communication module 117, a Bluetooth communication module 118, and/or the like.

The NFC communication module 117 may perform data communication with devices located within a distance of 10 cm or less (preferably within 4 cm) by using a very short-range contactless data transfer technology associated with Radio Frequency IDentification (RFID). An electronic device adopting a Near Field Communication (NFC) technology may communication with another electronic device adopting the NFC technology through at least one of a reader mode, a card emulation mode, and/or a peer-to-peer module. The NFC communication module 117 may be described below in detail with reference to FIG. 3.

The Bluetooth communication module 118 may perform data communication with devices within a radius of between 10 m and 100 m by using Bluetooth, which is one type of near field radio communication standard. Bluetooth is a short-distance wireless networking technology co-created by the Bluetooth Special Interest Group (SIG) organized in 1998 by five companies including Ericsson, IBM, Toshiba and the like.

The block diagram of FIG. 2 is merely one example of the short range communication module 114 (of the mobile terminal 100). Components illustrated therein are not essential, and more or less components than those shown in FIG. 2 may be included.

Figure 3:
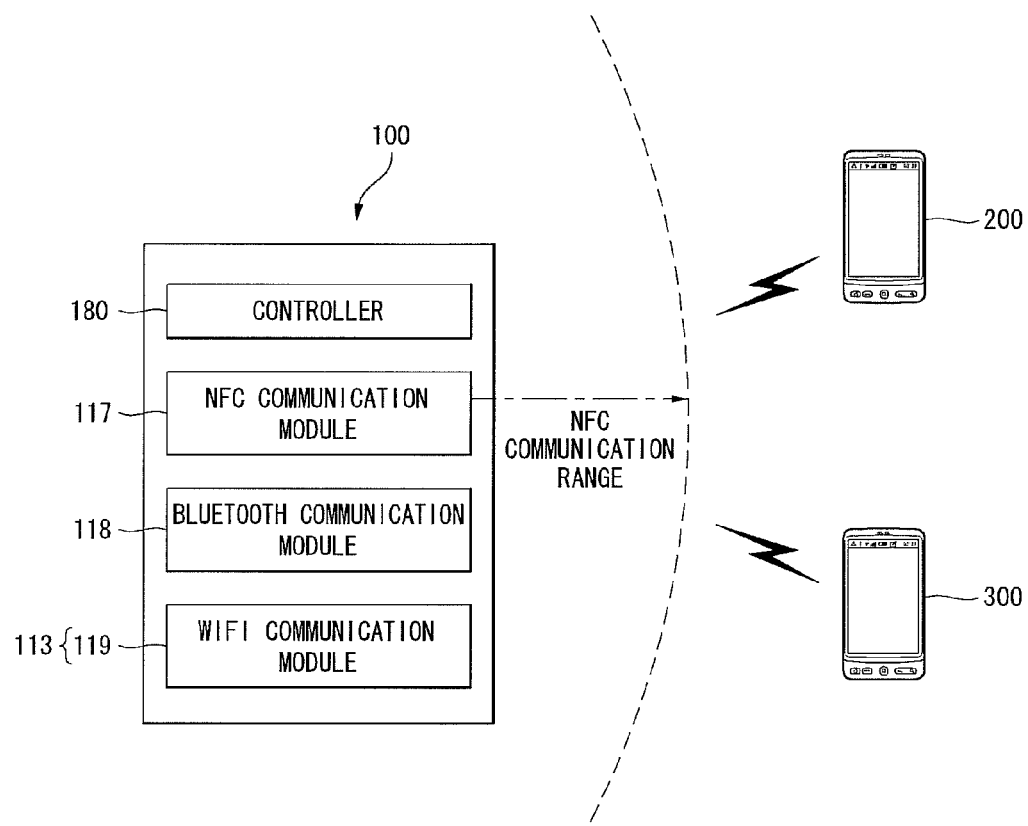
FIG. 3 is a view of a system environment including a mobile terminal according to an embodiment.

FIG. 3 is a view of a system environment including the mobile terminal 100 according to an embodiment. As shown in FIG. 3, the system environment may include the mobile terminal 100, and one or more electronic devices 200 and 300 that may form an NFC link with the mobile terminal 100. The electronic devices 200 and 300 may be mobile terminals.

The above is not an essential configuration of the system environment, and the system environment may include more or less components than those shown in FIG. 3. Further, in FIG. 3, components required for communication link configuration may be schematically illustrated in order to focus on features of the communication link configuration of the mobile terminal 100.

The system environment (in FIG. 3) may be implemented by mobile terminals. The electronic devices 100, 200 and 300 may be electronic devices that support NFC. That is, the electronic devices 100, 200 and 300 may be mobile terminals such as mobile phones, smart phones, and/or tablets PCs that support NFC, or may be electronic devices such as printers, TVs, DTVs, computers, and/or audio devices. An electronic device having an NFC function may be referred to as an NFC electronic device.

In FIG. 3, the mobile terminal 100 may configure an NFC link with other electronic devices 200 and 300 based on an NFC technology, which is one kind of short range communication technology, although embodiments are not limited thereto. For example, the mobile terminal 100 may form a wireless communication link with other electronic devices 200 and 300 by using a short range communication technology other than NFC technology.

Referring to FIG. 3, the mobile terminal 100 may include the controller 180, the NFC communication module 117, the Bluetooth communication module 118, and a WiFi communication module 119.

The controller 180 may control components within the mobile terminal 100. The NFC communication module 117 may allow the mobile terminal 100 to form an NFC link with other electronic devices 200 and 300 that support NFC. The NFC communication module 117 may be called an NFC Forum device. The NFC communication module 117 may be referred to as a short range communication unit.

The NFC communication module 117 may form an NFC link through tagging with NFC communication modules of other electronic devices 200 and 300 within an NFC communication range.

The NFC communication module 117 may communicate with the NFC communication modules of other electronic devices 200 and 300 in various modes. For example, the various modes may include a card emulation mode, a reader mode, and/or a peer to peer mode.

In an example where the NFC communication module 117 operates in the card emulation mode, the NFC communication module 117 may function as a card, namely, a tag. The NFC communication modules of other electronic devices 200 and 300 operate in the reader mode and thus may acquire data from the NFC communication module 117.

In an example where the NFC communication module 117 operates in the reader mode, the NFC communication module 117 may act as a reader. The NFC communication module 117 of the mobile terminal 100 may acquire data from the NFC communication modules of other electronic devices 200 and 300 operating in the emulation mode.

In an example where the NFC communication module 117 operates in the peer to peer mode, the NFC communication module 117 (mobile terminal 100) and the NFC communication modules of other electronic devices 200 and 300 may exchange data with each other.

The mode of the NFC communication module 117 may be determined according a predetermined criterion. For example, the mode of the NFC communication module 117 may be set according to a user's input or a predetermined algorithm.

After forming the NFC link with the other electronic devices 200 and 300 through the NFC communication module 117, the mobile terminal 100 may form a different type of communication link from the NFC link with other electronic devices 200 and 300 through the Bluetooth communication module 118 and/or the WiFi communication module 119. The mobile terminal 100 may then continuously perform data communication with the other electronic devices 200 and 300 through a Bluetooth communication link and/or a WiFi communication link even when the NFC communication link is disconnected.

A series of processes of forming other communication links after the NFC link is formed such that the mobile terminal 100 can continuously communicate with the other electronic devices 200 and 300 through another wireless communication technology may be called handover.

It can be seen that in the mobile terminal 100, handover from an NFC communication link to a Bluetooth communication link or a WiFi communication link may be performed. However, embodiments are not limited thereto. For example, the mobile terminal 100 may perform handover to various communication links such as RFID communication link, a Wireless Gigabit (WiGigt) communication link, and/or the like.

Although not shown in FIG. 3, other electronic devices 200 and 300 may include components corresponding to those of the mobile terminal 100. That is, the other electronic devices 200 and 300 may each include a controller, an NFC communication module, a Bluetooth communication module, and/or a WiFi communication module.

As for the handover, the mobile terminal 100 may form an NFC link with the other electronic devices 200 and 300 and then form other communication links to perform data communication. A user may easily form an NFC link between the mobile terminal 100 and the other electronic devices 200 and 300 and then change a communication method to an alternative communication link better suited to long-distance and/or high-capacity data transmission than the NFC link.

The handover process of the mobile terminal may now be described in detail. For ease of description, a description may be made with reference to the system environment shown in FIG. 3. This is for ease of description, and thus technical aspects of embodiments are not limited to a specific environment or a specific device.

Figure 4:
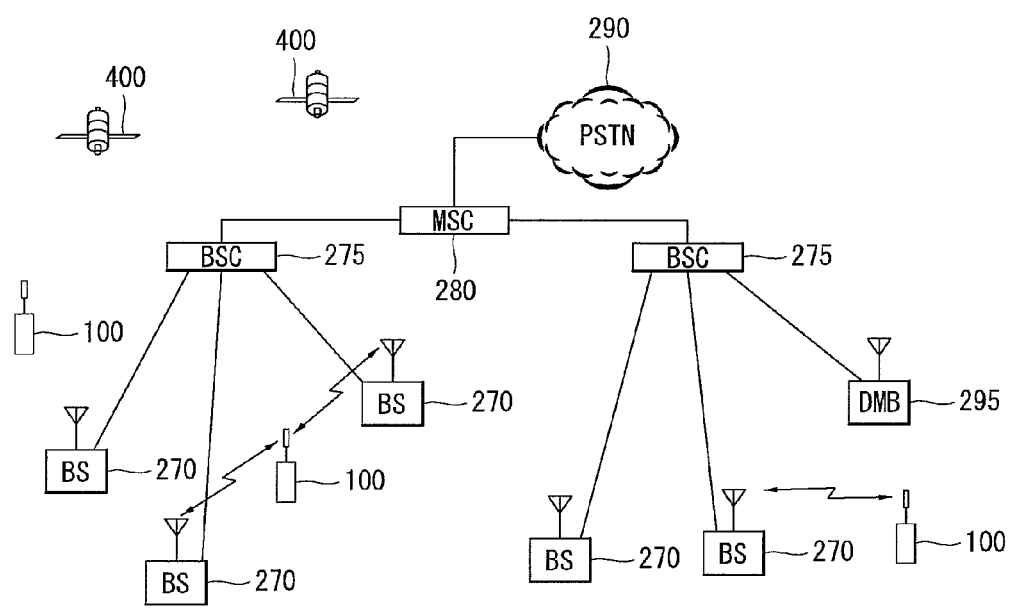
FIG. 4 is a configuration view of a CDMA wireless communication system communicating with the mobile terminal.

FIG. 4 illustrates one example in which the mobile terminal 100 forms a communication link with another electronic device 100 according to an embodiment. The process of forming the communication link may be described with reference to the appropriate drawings.

As shown in FIG. 4, a CDMA wireless communication system may include mobile terminals 100, base stations (BS) 270, base station controllers (BSC) 275, and a mobile switching center 280. The mobile switching center 280 may be connected to a public switch telephone network (PSTN) 290. The mobile switching center 280 may be connected to the base station controllers 275. The base station controllers 275 may be connected to the base stations 270 through backhaul lines. The backhaul lines may be constructed according to E1/T1, ATM, IP, PPP, frame relay, HDSL, ADSL or xDSL, which are well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 may be constructed to have frequency assignments, and the frequency assignments may have specific spectra (for example, 1.25 MHz and 5 MHz).

Intersection of sectors and frequency assignments may be referred to as a CDMA channel.

The base stations 270 may be referred to as base station transceiver subsystems (BTSs). Base station may be used as a term that collectively designates the base station controller 275 and one or more base stations 270 in several examples. Further, the base stations 270 may be referred to as cell sites. Otherwise, individual sectors of a given base station 270 may be referred to as cell sites.

A terrestrial DMB transmitter 295 may transmit broadcasting signals to the mobile terminals 100 operating in the CDMA wireless communication system. The broadcasting receiving module 111 of each mobile terminal 100 may be constructed to receive the broadcasting signals transmitted from the DMB transmitter 295. This may be similarly applied to different types of broadcast and multicast signaling as described above.

FIG. 4 also shows global positioning system (GPS) satellites 400. These satellites 400 may track positions of some or all of the mobile terminals 100 and/or electronic devices. Although two satellites are shown in FIG. 4, position information may be obtained from less than or more than two satellites. Additionally, other position-tracking techniques (for example, position-tracking techniques that can substitute for GPS technique or can be added to the GPS technique) may be used. If required, some or all of the GPS satellites 400 can support satellite DMB transmission separately or additionally.

When the CDMA wireless communication system operates, the base stations 270 may receive reverse link signals from the mobile terminals 100 (or electronic devices). The mobile terminals 100 may be in a state that the mobile terminals 100 are making calls, sending messages or performing other communications. The reverse link signals received by the base stations 270 may be processed by the base stations 270. The processed data may be transmitted to the base station controllers 275 connected to the base stations 270. The base station controllers 275 may provide call resource allocation and mobility management functionality including soft handoffs between the base stations 270. Further, the base station controllers 275 may transmit the received data to the mobile switching center 280. The mobile switching center 280 may provide additional routing services for interfacing with the PSTN 290. Similarly, the PSTN 290 may interface with the mobile switching center 280, and the mobile switching center 280 may interface with the base station controllers 275. The base station controllers 275 may control the base stations 270 to transmit forward link signals to the mobile terminals 100.

Figure 5:
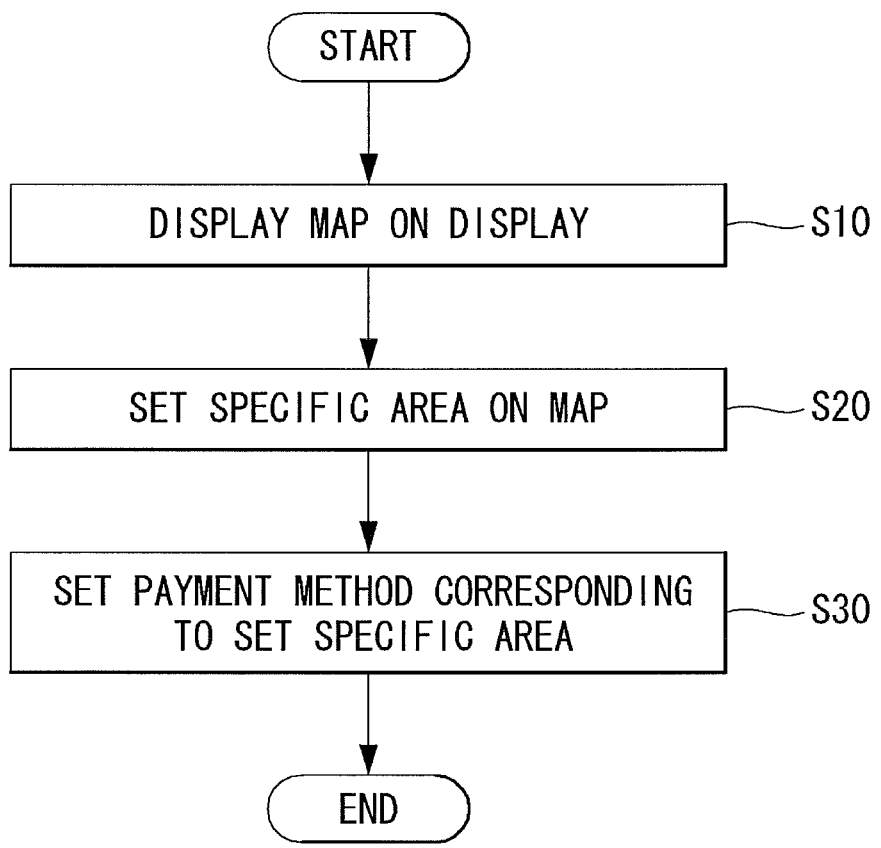
FIG. 5 is a flowchart showing an operation of a mobile terminal according to an embodiment.

FIG. 5 is a flowchart showing an operation of a mobile terminal according to an embodiment. Other operations, orders of operations and embodiments are also within the scope of the present invention.

As shown therein, the controller 180 may select a specific area on a displayed map and thus set a payment method corresponding to the specific area.

More specifically, a map may be displayed on the display 151 in operation S10. The map may indicate a geographical location including a spot at which the mobile terminal 100 is currently located. The map may be stored in the memory 160. Additionally and/or alternatively, the map may be acquired substantially in real time through the wireless communication module 110 and may be displayed. For example, when the mobile terminal 100 is in location A, the mobile terminal 100 may receive and display a map regarding the location A. When in location B, the mobile terminal 100 may receive and display a map regarding the location B.

Various information may be displayed on the map. Information displayed on the map may include information regarding a spot where payment may be made using the short range communication module 114. For example, information regarding a shopping mall, a store and/or the like may be displayed.

A specific area on the map may be set in operation S20. That is, a user may select a specific area on the displayed map. For example, the area may be set by drawing a circle, a polygon, and/or a closed loop about (or around) the current location of the mobile terminal 100.

A plurality of specific areas may be set on the map. For example, area A, area B and area C may be set on the map. The areas may be independent from one another and/or may have overlapping portions.

A payment method corresponding to a set specific area may be set in operation S30. The payment method may be a method used to pay a price for an article and/or a server. For example, the payment method may be a credit card, a debit card, cash, points and/or the like.

A corresponding payment method may correspond to the set specific area. For example, in an example where a user sets area A, area B, and area C, then card D, card E and card F may be set for payment in the area A, the area B, and the area C, respectively. By allowing a specific card to be used to pay the price in the specific area, a user's inconvenience of selecting a card every time may be eliminated and/or reduced.

FIGS. 6A-6B and 7A-7B are views showing a process of setting a specific area in the mobile terminal (shown in FIG. 5).

As shown therein, a user may select a specific area on a displayed map and the mobile terminal 100 may store information related to the specific area.

Figure 6A:
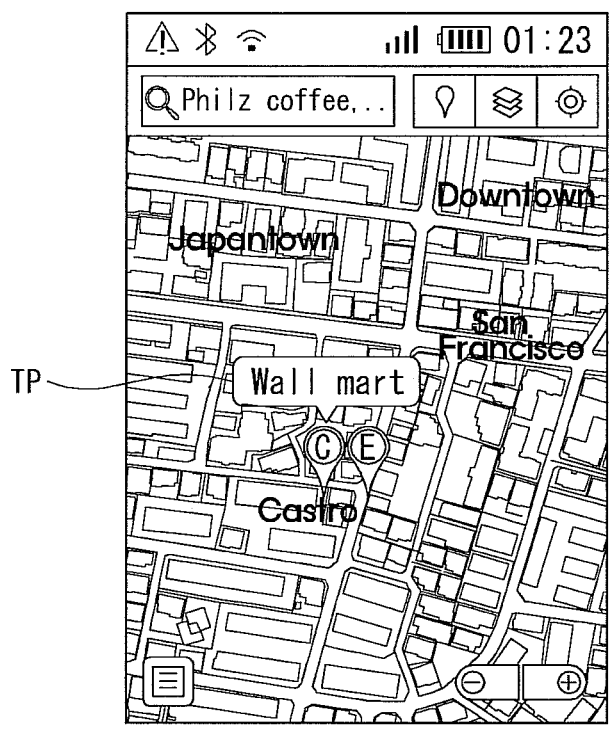
FIGS. 6A-6B and 7A-7B are views showing a process of setting a specific area in the mobile terminal (shown in FIG. 5)

As shown in FIG. 6A, a map may be displayed on the display 151. A payment place TP (or touch place) may be displayed on the map. The payment place TP may be the place (such as Walmart) where payment may be made using a card or the like.

Figure 6B:
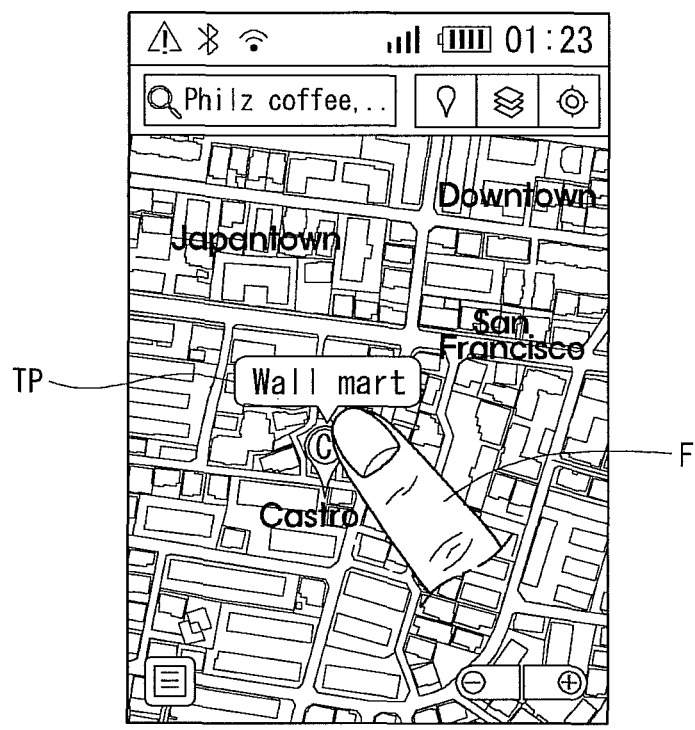

As shown in FIG. 6B, a user may touch the touch place using a finger F and/or the like.

Figure 7A:
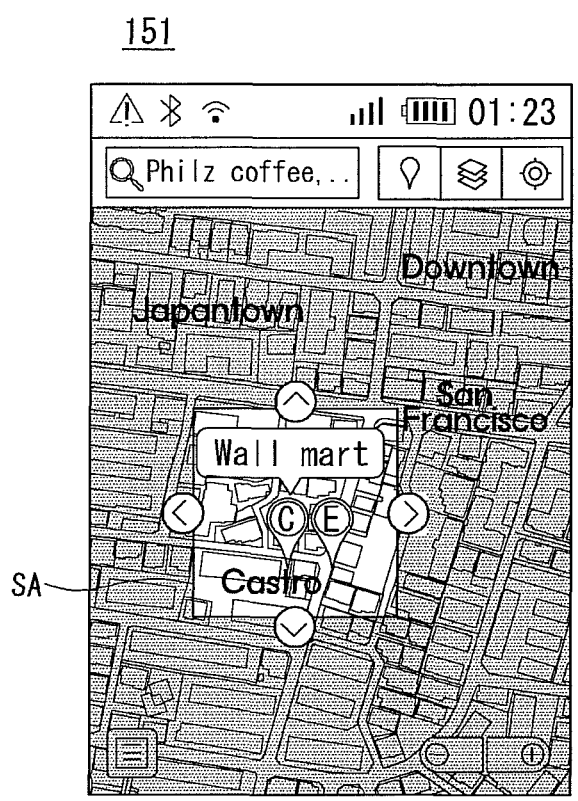

As shown in FIG. 7A, when the user touches the payment place TP, the controller 150 may display a selection area SA. The selection area SA may be a closed loop that includes the payment place TP.

Figure 7B:
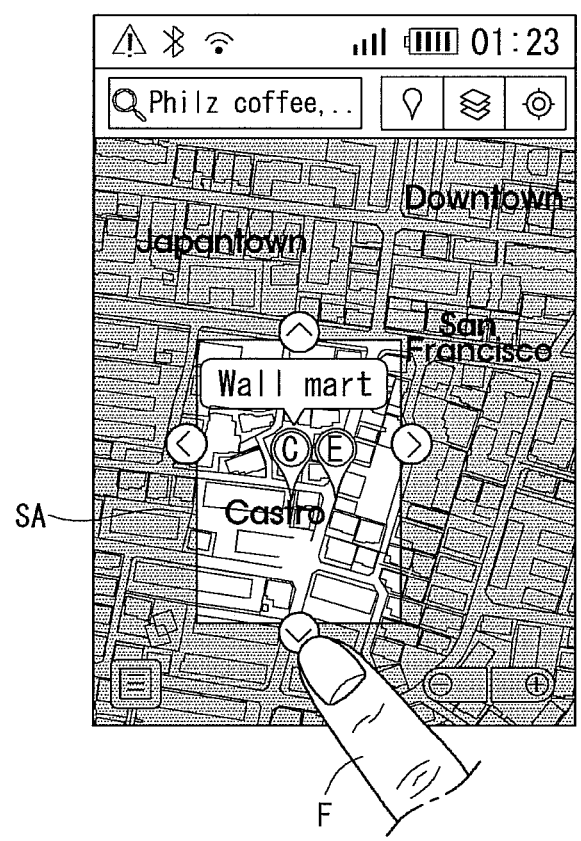

As shown in FIG. 7B, when the user touches a boundary of the selection area SA and drags it in a predetermined direction, the area of the selection area SA may change. That is, the area of the selection area SA may change through a touch operation.

FIGS. 8A-8D are views showing a process of setting a payment method in the mobile terminal (shown in FIG. 5).

As shown therein, the mobile terminal 100 may allow for selection of a payment method to be used in the set selection area SA.

Figure 8A:
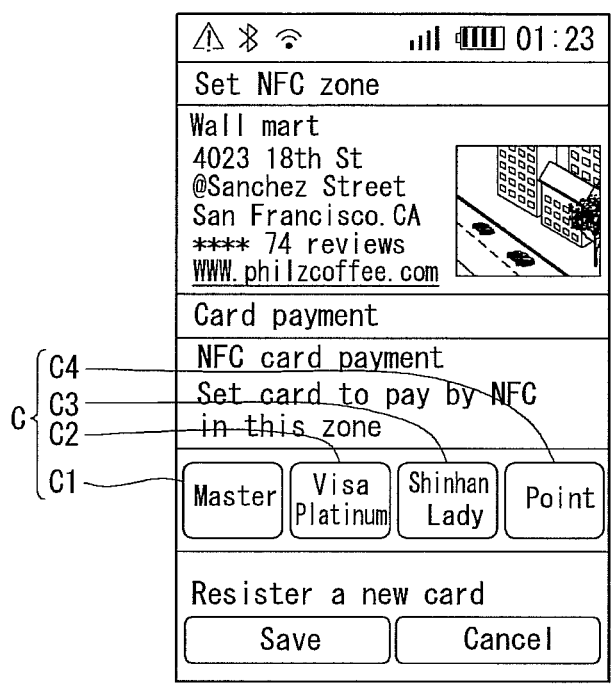
FIGS. 8A-8D are views of a process of setting a payment method in the mobile terminal (shown in FIG. 5)

As shown in FIG. 8A, the display 151 may display a screen allowing for selection of a payment method C, which may be used in the set selection area SA. A plurality of payment methods C may be displayed, and the plurality of payment methods C may be credit cards of the user of the mobile terminal 100.

Figure 8B:
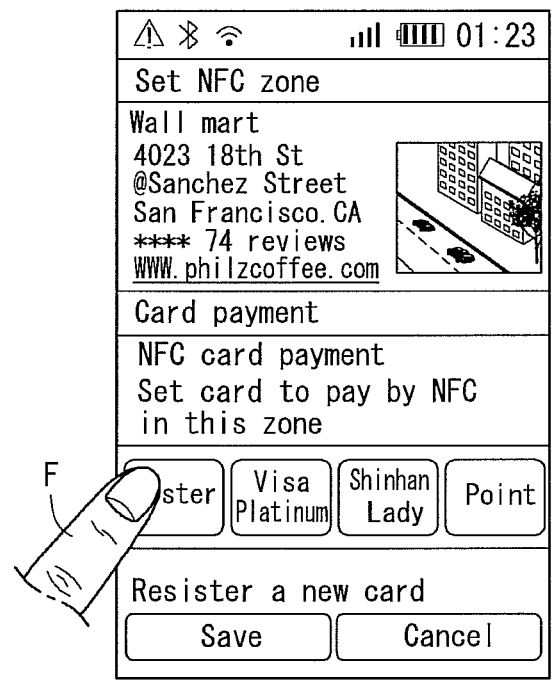

As shown in FIG. 8B, the user may select a specific one from among the plurality of payment methods C with a finger F (and/or the like).

Figure 8C:
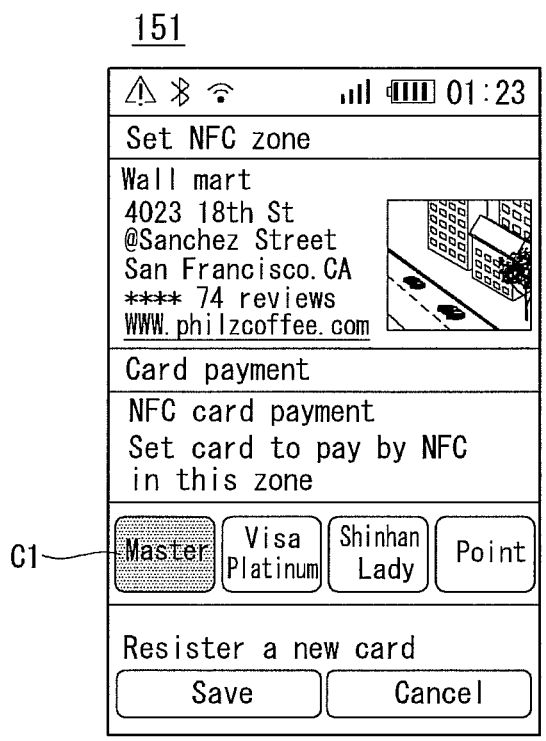

As shown in FIG. 8C, a first payment method selected by the user may be displayed differently from the other payment methods C2 to C4. Accordingly, the user may intuitively recognize the payment method C that the user has selected.

Figure 8D:
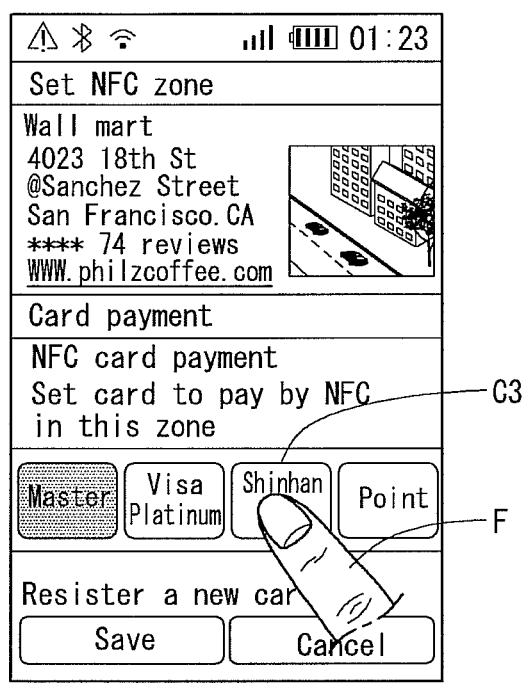

As shown in FIG. 8D, the user may additionally select a third payment method C3. When the user additionally selects the third payment method C3, payment may be made in the corresponding selection area SA by using the first and third payment methods C1 and C3. When the user selects the first and third payment methods C1 and C3, payment in the selection area SA may be made using the corresponding cards. This may reduce the need to perform additional manipulation for payment using the mobile terminal 100 within this specific area.

FIGS. 9A-9B, 10 and 11 are views showing setting of specific areas of a mobile terminal.

As shown, the mobile terminal 100 may allow a user to select a plurality of selection areas SA1 to SA3.

Figure 9A:
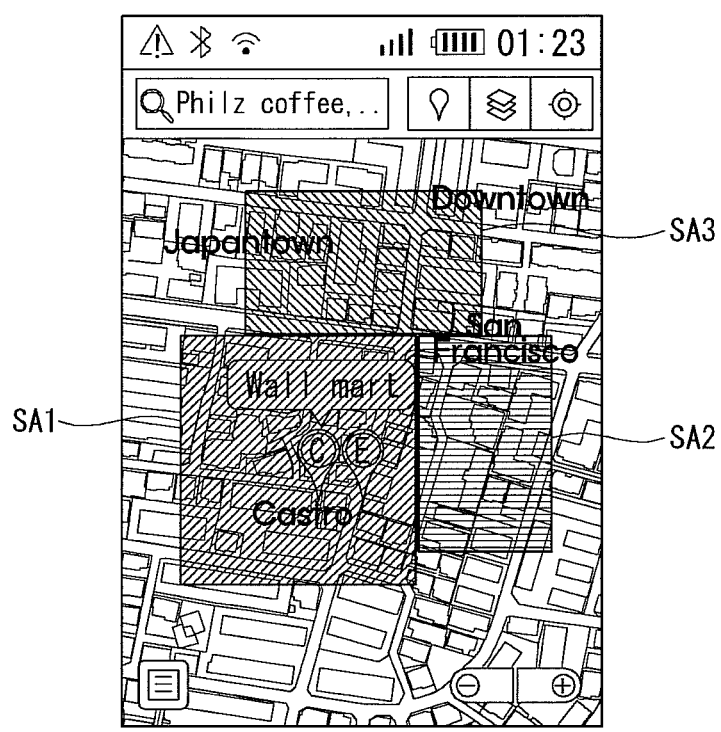
FIGS. 9A-9B, 10 and 11 are views showing setting of specific areas in the mobile terminal.

FIG. 9A shows that first to third selection areas SA1 to SA3 selected by the user may be displayed on the display 151. The first to third selection areas SA1 to SA3 may be determined by the user's selection. For example, the user may set the first to third selection areas SA1 to SA3 by performing a touch operation.

The first to third selection areas SA1 to SA3 may be displayed differently in terms of color and/or shape based on their attributes. For example, the first selection area SA1, the second selection area SA2, and the third selection area SA3 may be displayed in black, red, and blue, respectively. Accordingly, the user may intuitively recognize boundaries of the selection areas SA1 to SA3.

Figure 9B:
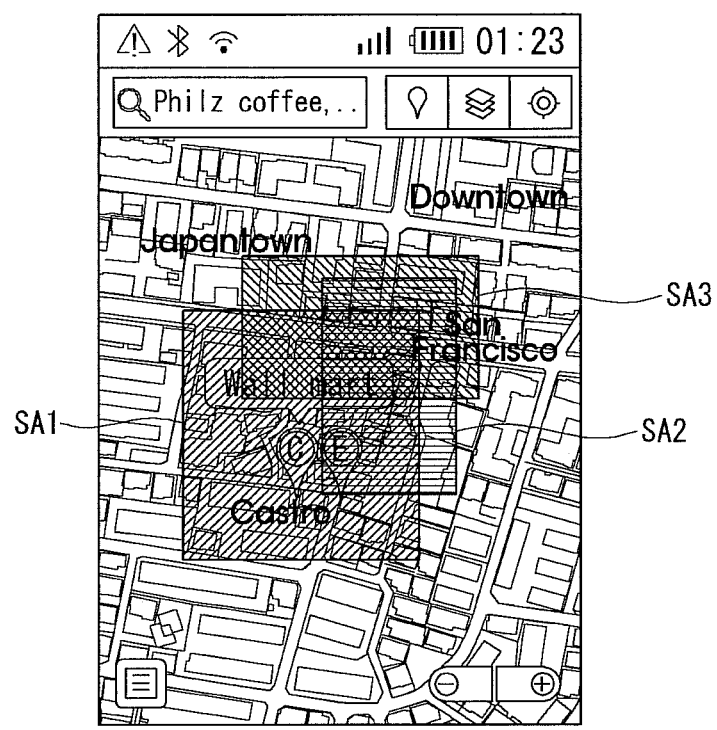

As shown in FIG. 9B, at least one of the first to third selection areas SA1 to SA3 may partly overlap the other one of the first to third selection areas SA1 to SA3. For example, a portion of the first selection area SA1 may overlap the second or third area SA2 or SA3.

In the overlapping portion, payment methods may overlap. For example, in an example where card A is set to be used for payment in the first selection area SA1, and card B is set to be used for payment in the second selection area SA2, both cards A and B may be used in the overlapping portion between the first selection area SA1 and the second selection area SA2.

Figure 10:
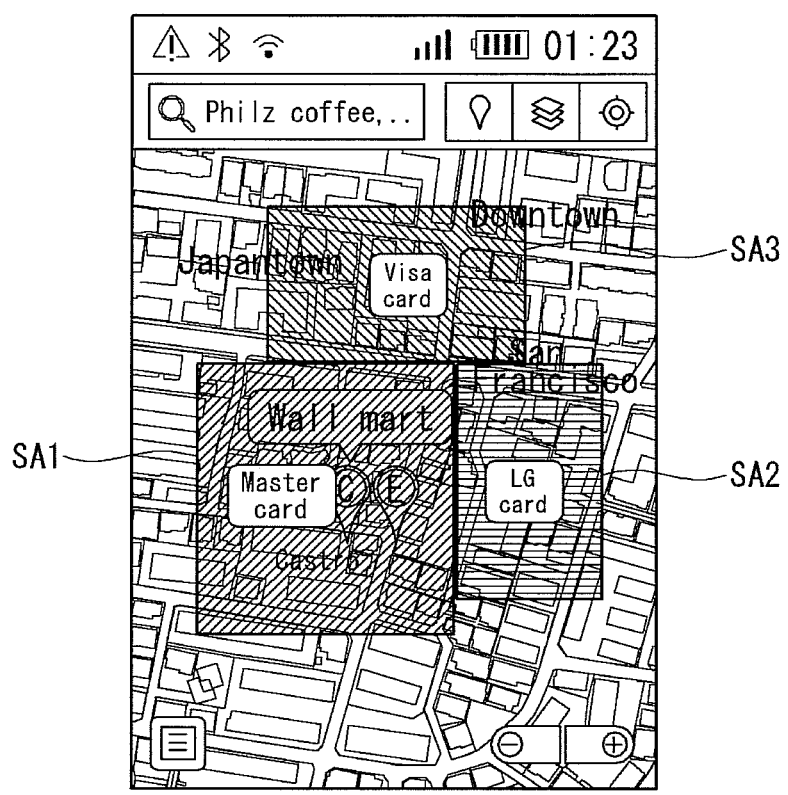

As shown in FIG. 10, information regarding a card, which is a payment method, may also be displayed in each of the selection areas SA1 to SA3. For example, information indicating that a Mastercard is set, information indicating that an LG card is set, and information indicating that a Visa card is set may be displayed in the first selection area SA1, the second selection area SA2, and the third selection area SA3, respectively.

Figure 11:
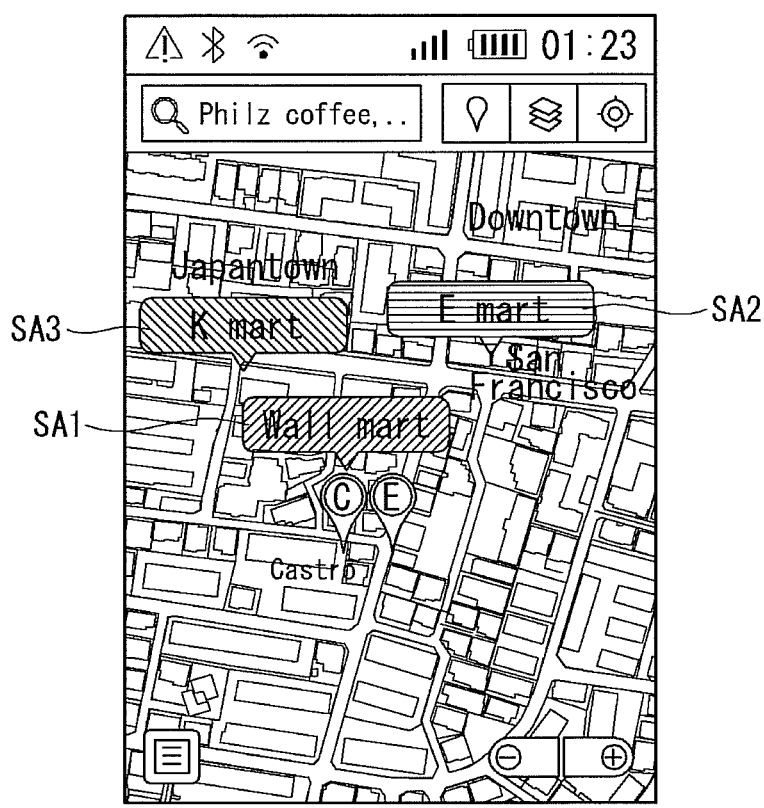

As shown in FIG. 11, the respective selection areas SA1 to SA3 may be specific stores. For example, the first selection area SA1, the second selection area SA2, and the third selection area SA3 may correspond to a Walmart, an E-mart, and a K-mart, respectively. Accordingly, to make payment in a specific store, a corresponding card may be used for payment.

Figure 12:
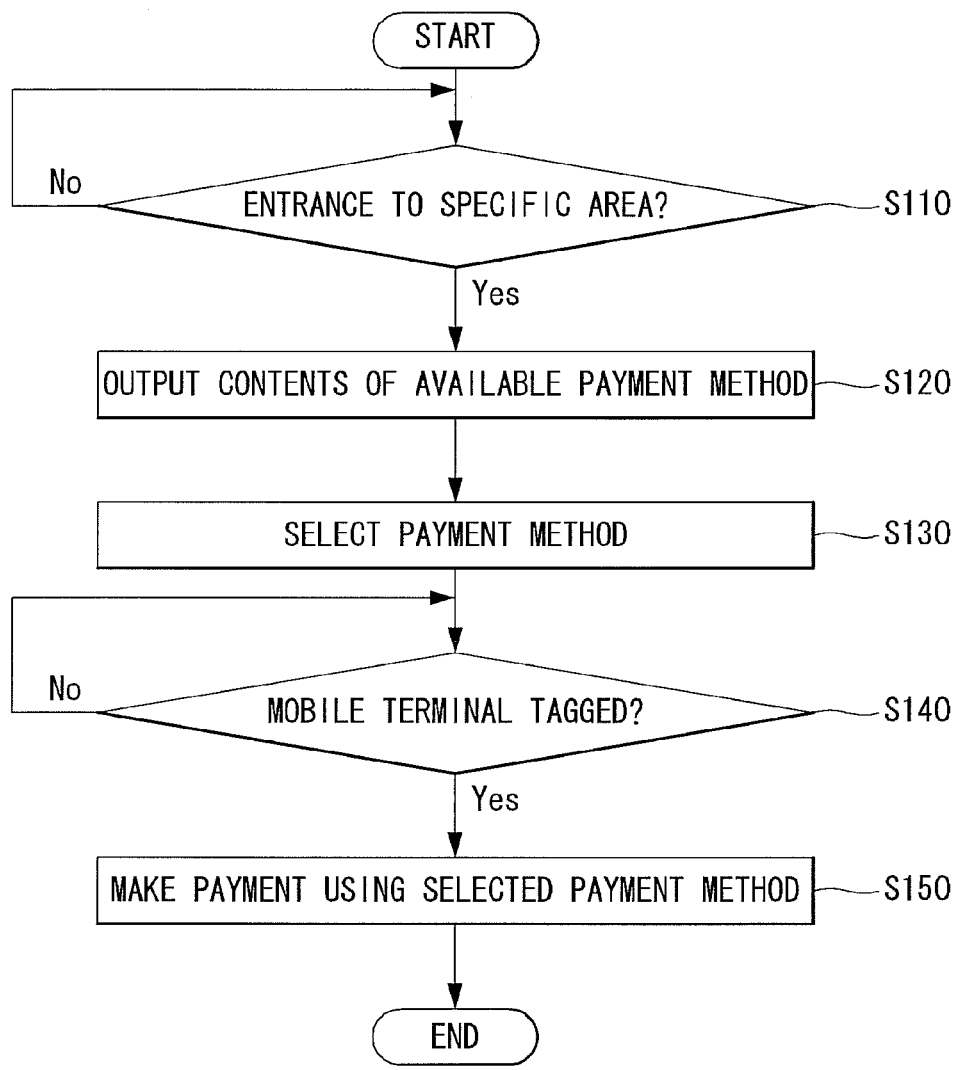
FIG. 12 is a flowchart showing an operation of a mobile terminal according to an embodiment.

FIG. 12 is a flowchart showing an operation of a mobile terminal according to an embodiment. Other operations, orders of operations and embodiments are also within the scope of the present invention.

As shown therein, the controller 150 may allow for a determination as to whether the mobile terminal 100 enters a specific area.

The specific area may be a selection area that is set in advance by the user. The controller 150 may calculate (or determine) a current location of the mobile terminal 100 through the location information module 115. The controller 150 may determine whether or not the current location of the mobile terminal 100 is within a preset selection area.

When the mobile terminal 100 enters a specific area, contents of a usable payment method (or allowable payment method) may be output in operation S120.

The user may set in advance a payment method (such as a card or the like) that may be used for payment in a specific selection area. When the set payment method exists, the controller 150 may display the contents on the display 151 or output the contents through the audio output module 152.

Thereafter, the payment method may be selected in operation S130.

The selection of the payment method may be automatically performed through the controller 150 or may be performed by a user's operation of selecting a specific payment method.

The mobile terminal 100 may determine whether or not tagging is made in operation S140.

The tagging may be an operation to set a communication link through Near Field Communication (NFC). For example, the moving of a first electronic device closer to a second electronic device within a predetermined distance may be tagging. When the tagging is made, a communication link may be set between the first electronic device and the second electronic device. Once the communication link is set, data exchange may be made through the communication link.

When the mobile terminal is tagged, an operation in which payment is made using the selected payment method may be performed in operation S150.

Since the communication link is set when the tagging is made, a data exchange may be performed through the set communication link. Data being exchanged may be information regarding payment using a specific card, which is the selected payment method. That is, in the preset area, payment may be made using a preset card.

Figure 13:
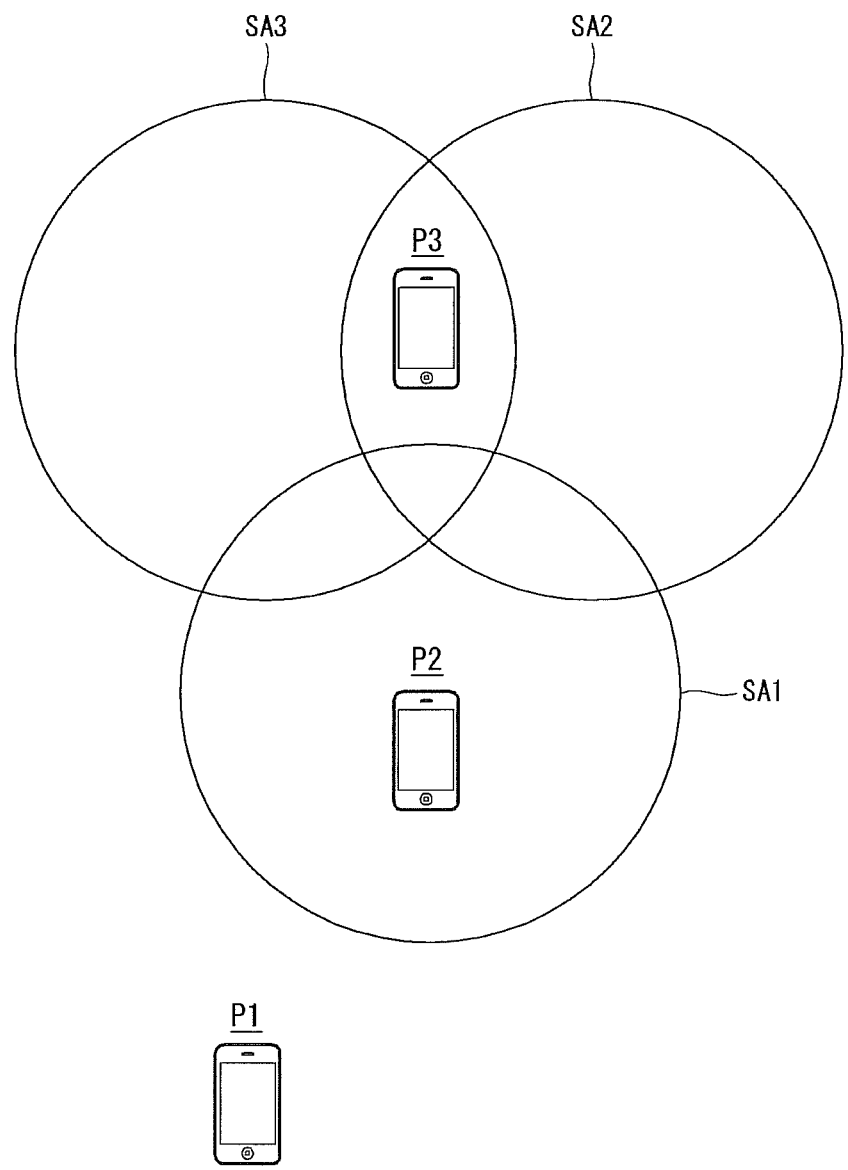
FIG. 13 shows a relationship between the mobile terminal (shown in FIG. 12) and a specific area in terms of location.

FIG. 13 illustrates a relationship between the mobile terminal (shown in FIG. 12) and a specific area in terms of location.

The controller 150 may perform different operations according to its location.

A first position P1 may be a spot outside the first to third selection areas SA1 to SA3. When the mobile terminal 100 is at the first position P1 outside the first to third selection areas SA1 to SA3, a payment procedure may be carried out regardless of a preset payment method or the like.

A second position P2 may be a spot within the first selection area SA1. When the mobile terminal 100 is located at the second position P2 inside the first selection area SA1, a payment procedure may be carried out using a payment method set for the first selection area SA1. For example, in the example where payment in the first selection area SA1 is set to be made using an LG card, when tagging is performed in the first selection area SA1, payment may be made using the LG card.

A third position P3 may be a spot where the second selection area SA2 overlaps the third selection area SA3. When the mobile terminal 100 is located in the third position P3 inside the second and third selection areas SA2 and SA3, a payment procedure may be carried out using payment methods set for the second and/or third selection areas SA2 and SA3.

FIGS. 14A-14B, 15A-15B and 16A-16B show selection upon a specific payment method in the mobile terminal (shown in FIG. 12).

The mobile terminal 100 may allow payment to be made through a specific payment method when the mobile terminal 100 enters a specific selection area.

Figure 14A:
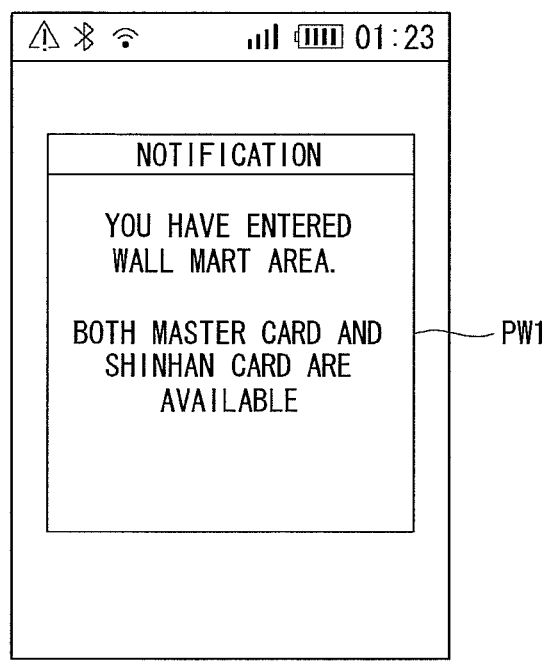
FIGS. 14A-14B, 15A-15B and 16A-16B show selection upon a specific payment method in the mobile terminal (shown in FIG. 12)

As shown in FIG. 14A, the controller 150 may display a first popup window PW1 that visually informs a user of entrance to a specific selection area. For example, the display 151 may display that the user has entered a Walmart area and contents may indicate that both Mastercard and Shinhan cards may be used for payment in the corresponding area.

Figure 14B:
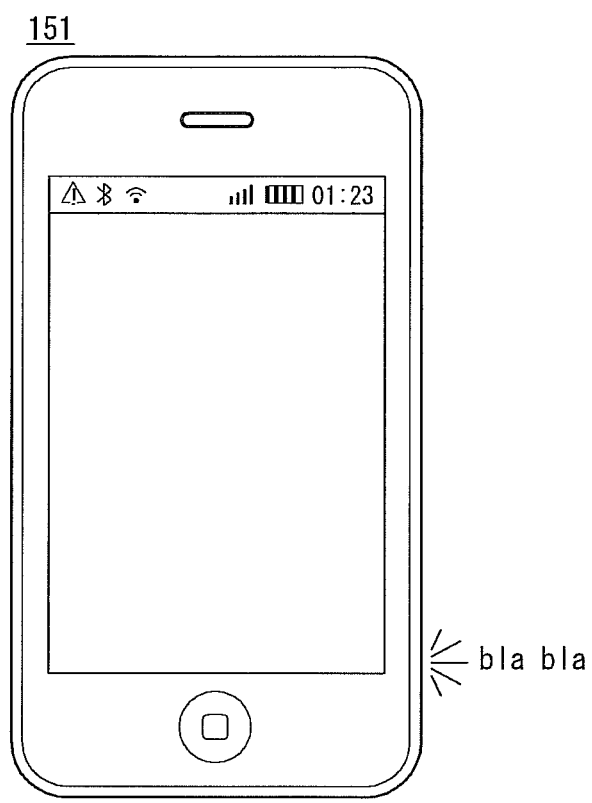

As shown in FIG. 14B, the controller 150 may audibly inform the user of entrance to a specific selection area. For example, the fact that the user has entered the Walmart area and contents indicating that both Mastercard and Shinhan cards may be used for payment in the corresponding area may be output through the audio output module 152.

Figure 15A:
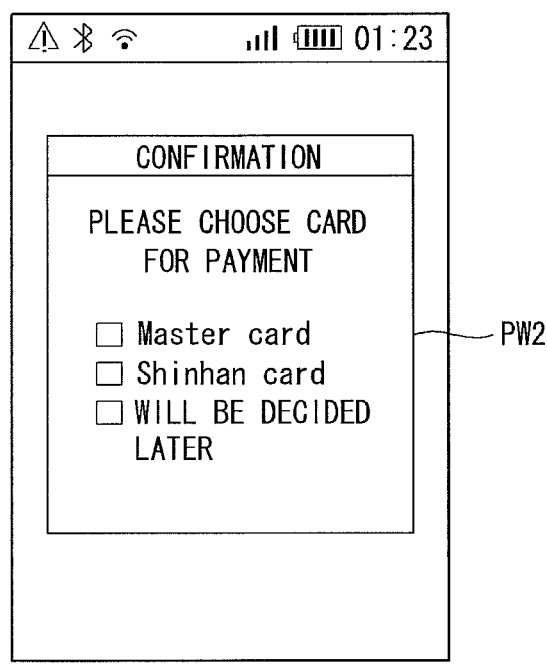

As shown in FIG. 15A, the controller 150 may display a second popup window PW2 that allows for selection as to which payment method is to be used for payment in a specific selection area. For example, payment methods of the user of the mobile terminal 100 may be displayed on the display 151. The user may select a specific one or more of the displayed payment methods.

Figure 15B:
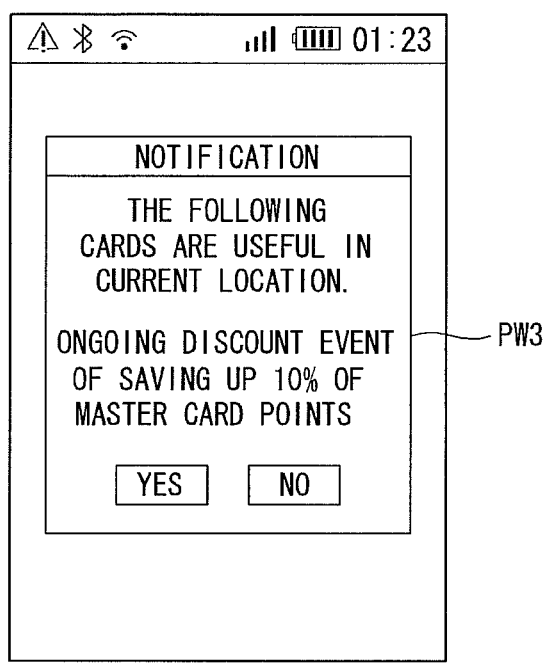

As shown in FIG. 15B, the controller 150 may display a third popup window PW3 that recommends a specific payment method in a specific selection area. When a specific payment method is used according to a selection area, there may be advantages. The controller 150 may determine which payment method is the optimum payment method in a specific selection area based on information acquired through the wireless communication unit 110 and/or the like. When the optimum payment method exists, the controller 150 may recommend the corresponding payment method and notify the user of the reason.

Figure 16A:
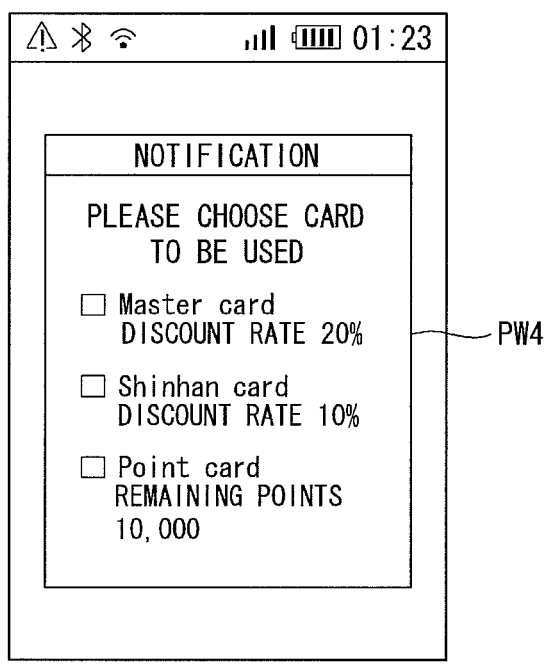

As shown in FIG. 16A, the controller may display a fourth popup window PW4 that allows for selection upon a specific payment unit to be used in a specific selection area. In this example, the controller 150 may guide the user to make an optimum selection by also displaying a discount rate and/or the like according to each payment method.

Figure 16B:
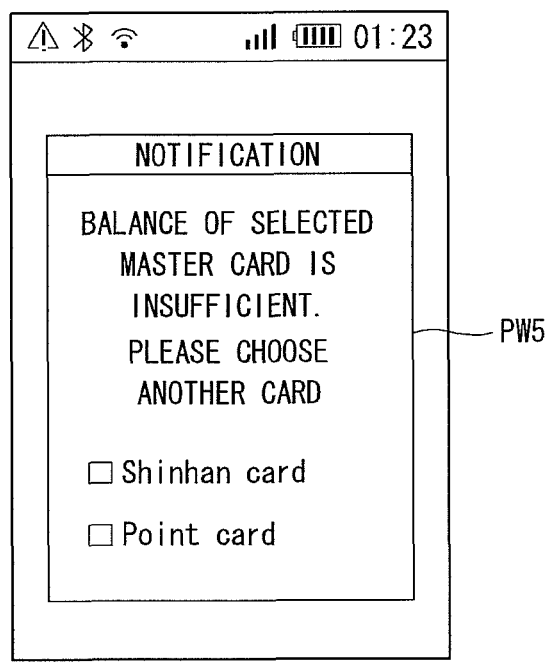

As shown in FIG. 16B, the controller 150 may display a fifth popup window PW5 that indicates a result of assessing appropriateness of a specific payment method selected by the user. For example, when the user selects a Mastercard, which is a specific payment method, but an available balance of the corresponding card is insufficient, the controller 150 may inform the user of the insufficiency and induce the selection of another payment method.

Figure 17:
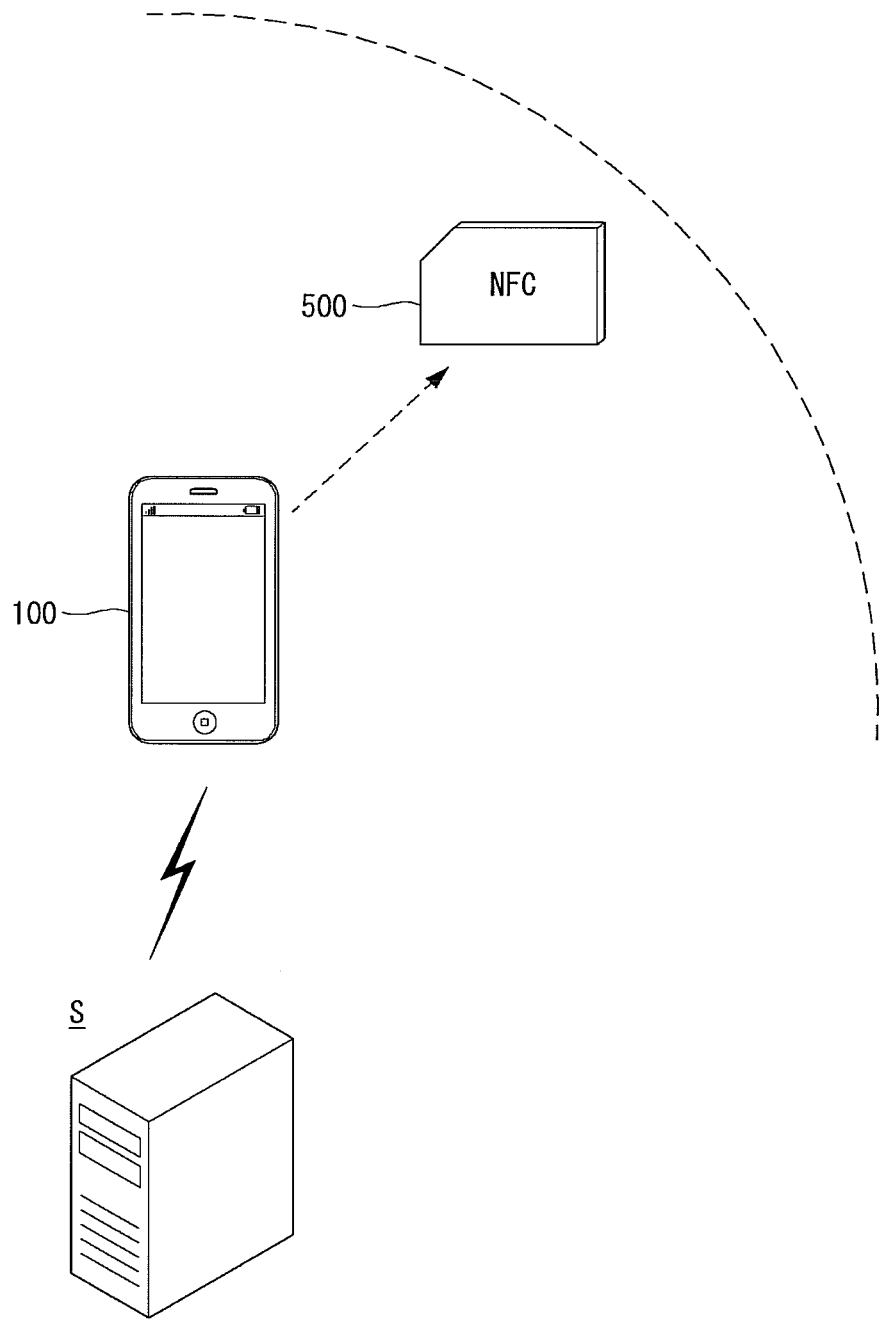
FIG. 17 is a view showing tagging of the mobile terminal (shown in FIG. 12)

FIG. 17 is a view showing tagging of the mobile terminal shown in FIG. 12.

The mobile terminal 100 may be tagged with a specific tag 500 and may set a communication link.

In an example where a specific payment method to be used in a specific selection area is selected, if the mobile terminal 100 is tagged with the tag 500 located within the specific selection area, payment may be made using the payment method.

In the specific location, the mobile terminal 100 may carry out payment through communication with a server S. For example, when the mobile terminal 100 is tagged with the tag 500 or a specific menu is selected at a specific location, payment may be made through communication with the server S.

FIGS. 18A-18B, 19A-19B, 20A-20B, 21A-21B and 22 show a payment process of the mobile terminal (shown in FIG. 12).

The mobile terminal 100 may make payment through various methods.

Figure 18A:
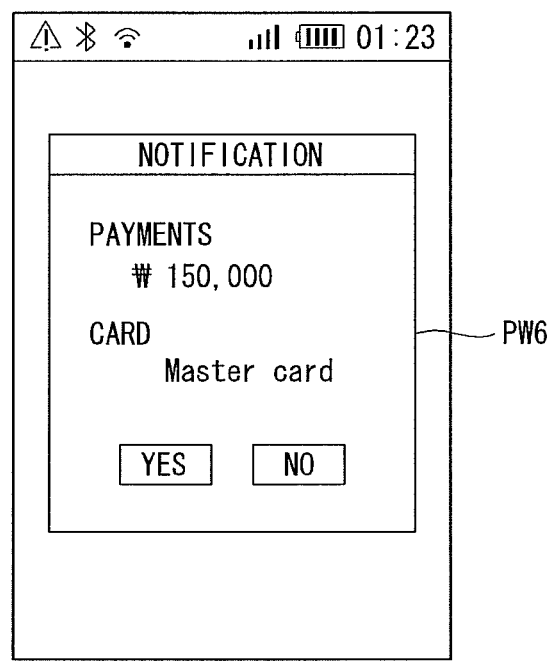

As shown in FIG. 18A, the controller 150 may display on the display 151 a sixth popup window PW6 that shows payment amounts. The sixth popup window PW6 may display an amount to be paid and a specific payment method. When a user having checked the amount and the specific payment method selects a check button, payment may proceed according to the corresponding contents.

The sixth popup window PW6 may be displayed in the following examples. For example, the sixth popup window PW6 may be displayed when the user enters a specific selection area, buys an article, and then tags the mobile terminal 100 with the tag 500. Since a specific payment method is set in advance to be used in a specific selection area, the controller 150 may display the fact on the sixth popup window PW6 and inform the user of the fact.

Figure 18B:
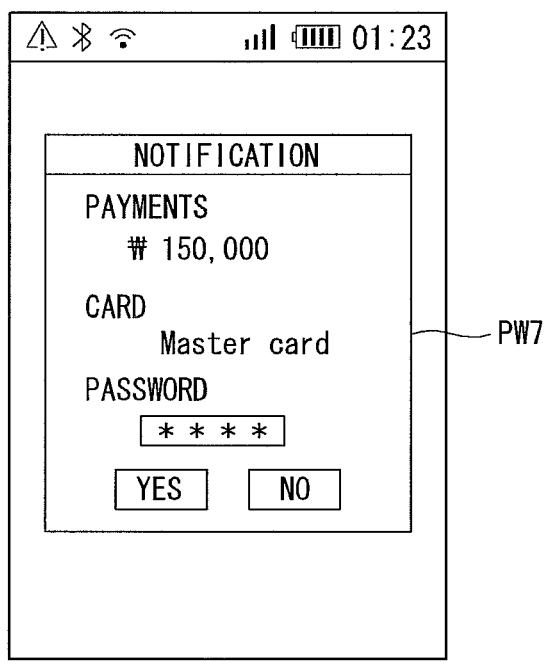

As shown in FIG. 18B, the controller 150 may display on the display 151 a seventh popup window PW7 that allows for input of the amount, a credit card, and a password. The seventh popup window PW7 is different from the sixth popup window PW6 in that the user is allowed to input a password with respect to a specific card.

Figure 19A:
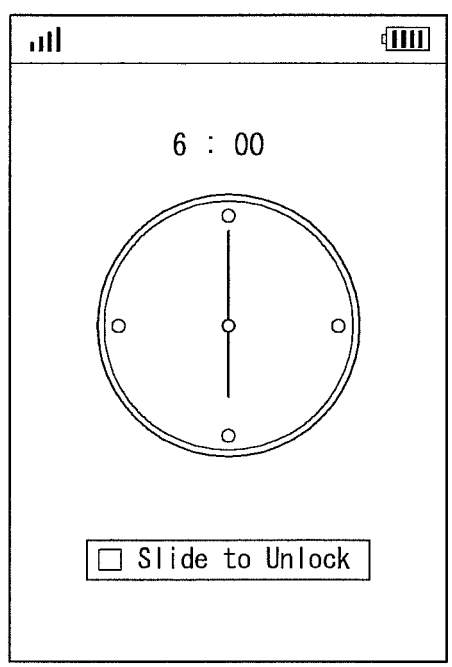

As shown in FIG. 19A, the mobile terminal 100 may be in a lock state. In order to prevent erroneous input, the lock state may be released in an example where a touch operation of moving a button in a specific direction is input.

Figure 19B:
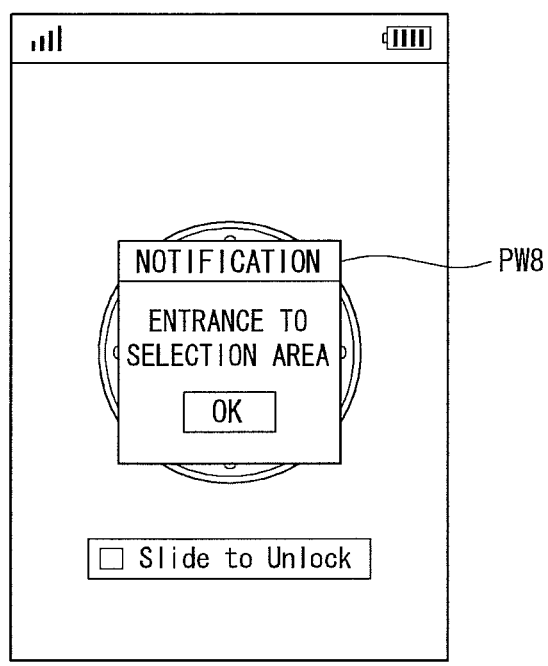

As shown in FIG. 19B, the mobile terminal 100 may display an eighth popup window PW8 that notifies entrance to a specific selection area despite the lock state. Since the eighth popup window PW8 notifying entrance to a specific selection area is displayed even in the lock state, the user's inconvenience caused in releasing the lock state may be obviated.

Figure 20A:
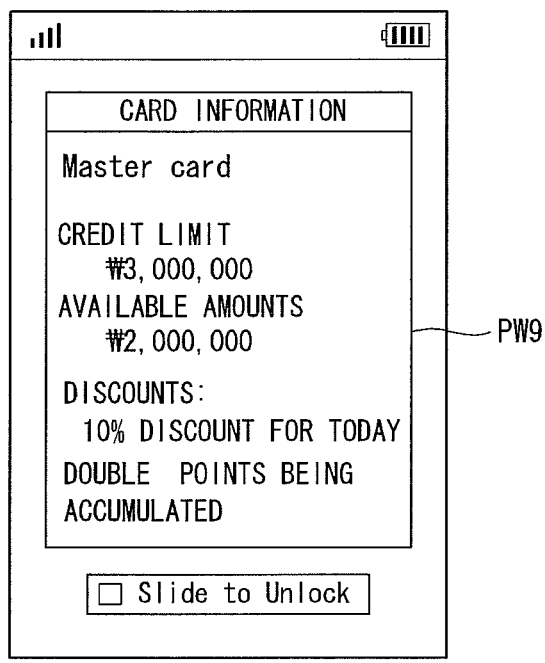

As shown in FIG. 20A, the mobile terminal 100 may display a ninth popup window PW9 that displays information regarding a card available for payment despite the lock state. Since relevant information can be displayed even in the lock state, the user's inconvenience caused in releasing the lock state can be obviated.

Figure 20B:
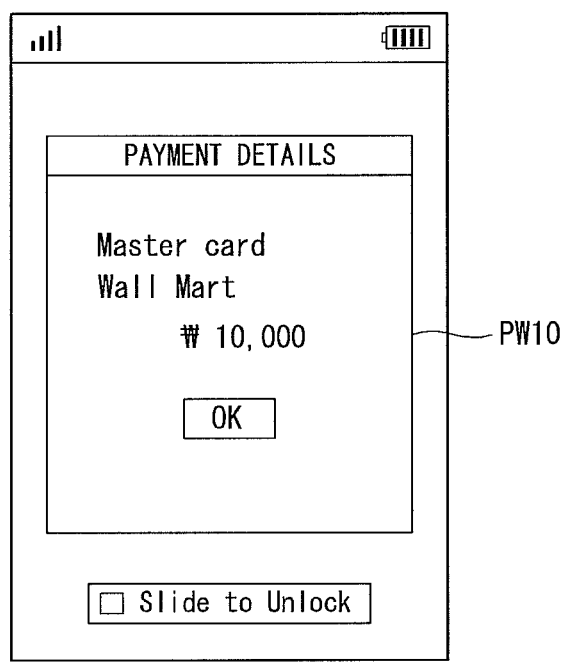

As shown in FIG. 20B, the mobile terminal 100 may display a tenth popup window PW10 that displays payment contents despite the lock state.

As shown in FIG. 21A, a password corresponding to each card, which is a payment method, may be recorded on the memory 160. The password corresponding to each card input by the user may be recorded in an encoded state.

Figure 21B:
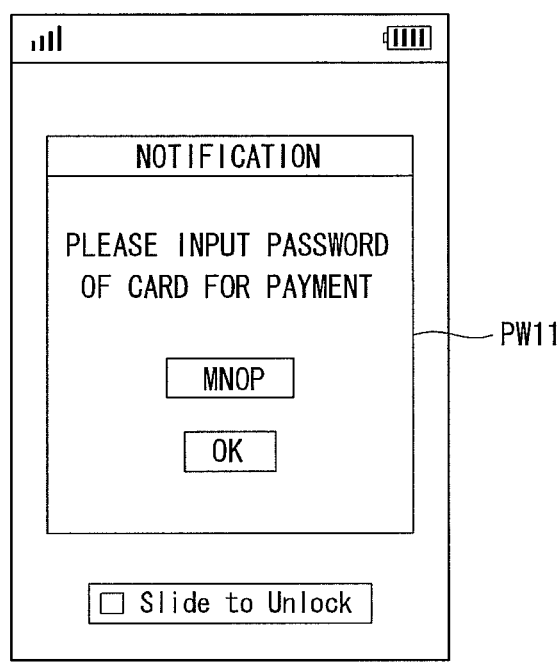

As shown in FIG. 21B, when an eleventh first popup window PW11 allowing for the input of a password of a card to be used for payment is displayed, the controller 150 may allow the password corresponding to the specific card to be automatically input.

Figure 22:
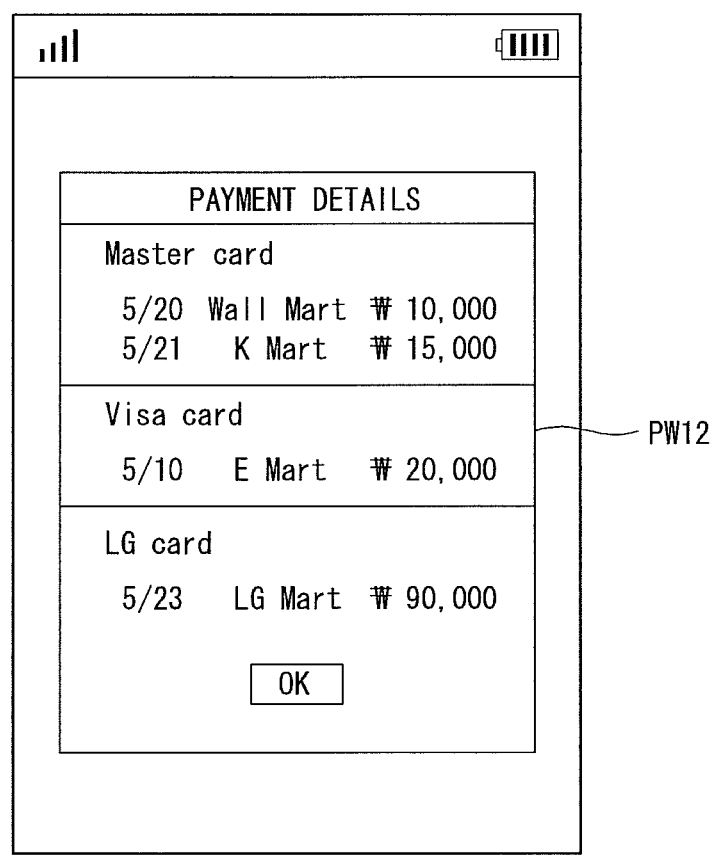

As shown in FIG. 22, the display 151 may display a twelfth popup window PW12 that displays payment details from the past. The payment details may be recorded on the memory 160. Since the payment details from the past are clearly displayed, convenience in using the mobile terminal 100 may be expected to increase.

The above-described method of controlling the mobile terminal may be provided as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen to display a first object, a second touch screen to display a second object, and a controller to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

A mobile terminal and a control method thereof may be capable of increasing convenience in using a mobile terminal by causing payment to be made at a specific location using a specific payment method.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display;
a location information module to identify a current location of the mobile terminal;
a short range communication module to provide a short range communication link with an electronic device;
a memory to store payment information corresponding to a specific location; and
a controller to display, on a first area of the display, an indicator to notify a lock state of the display, the controller to display, on a second area of the display, a window notifying at least one payment information available at a current location when the current location corresponds to at least one of the stored payment information of the specific location, and in response to receiving an input for selecting at least one of the payment information available, the controller to provide a payment to the electronic device having the short range communication link, based on the selected payment information.

2. The mobile terminal of claim 1, wherein the controller is configured to display a map on the display and to display the payment information on the displayed map.

3. The mobile terminal of claim 1, wherein the controller is configured to display a map on the display and to receive a user's touch input,
wherein the controller is configured to display the payment information to be used for the payment in a specific area of the displayed map.

4. The mobile terminal of claim 1, wherein the controller is configured to perform an authentication process with respect to a corresponding payment method and to provide the payment to the electronic device when the authentication with respect to the corresponding payment method is successful.

5. The mobile terminal of claim 1, wherein the short range communication module includes a Near Field Communication (NFC) module, a Bluetooth communication module or a WiFi communication module.

6. A mobile terminal comprising:
a display;
a location information module to identify a current location of the mobile terminal;
a memory to store information associated with payment corresponding to a specific location; and
a controller to display, on a lower display portion a lock state indicator and to display, on an upper display portion, a window to provide at least one available information associated with payment for the current location when the current location corresponds to at least one of the stored information associated with payment corresponding to the specific location.

7. The mobile terminal of claim 6, wherein the controller is configured to display a map on the display and to display the information associated with payment available on the displayed map.

8. The mobile terminal of claim 6, wherein the controller is configured to display a map on the display and to receive a user's touch input,
wherein the controller is configured to display information associated with payment to be used for payment in a specific area on the displayed map based on the touch input.

9. The mobile terminal of claim 6, wherein the controller is configured to perform an authentication based on the information associated with payment.

10. A method of a mobile terminal, the method comprising:
obtaining a short range communication link between the mobile terminal and an electronic device;
storing information associated with payment corresponding to a specific location;
displaying, on a lower display portion of a display of the mobile terminal, a lock state indicator;
displaying, on an upper display portion of the display, a window to provide at least one available information associated with payment for the current location when the current location corresponds to at least one of the stored information associated with payment corresponding to the specific location; and
providing a payment to the electronic device having the short range communication link based on one of the displayed at least one available information associated with payment available for the current location.

11. The method of claim 10, wherein the displaying of a window includes:
displaying a map; and
displaying information associated with payment specific area on the displayed map.

12. The method of claim 10, wherein the providing of a payment includes providing the payment when an authentication with respect to a corresponding payment method is successful.

13. The method of claim 10, wherein the short range communication link is a Near Field Communication (NFC) link.

14. The method of claim 10, further comprising:
receiving an input to select one of the available information associated with payment.

15. The method of claim 10, further comprising displaying, on the display, at least one optimum information associated with payment available for the current location.

16. The method of claim 10, further comprising displaying, on the display, a discount rate of the information associated with payment.

17. The method of claim 10, further comprising displaying, on the display, a window notifying entrance to the current location while the display is in the lock state, when the current location corresponds to the stored specific location, wherein the window is displayed at an area above the lock state indicator, and wherein the window notifying entrance includes an upper part and a lower part.

18. The method of claim 10, wherein the information associated with payment includes at least one of a type of card, a credit limit, an available amount and a discount, and the method further comprises displaying, on the display, at least one of the type of card, the credit limit, the available amount and the discount.

19. The method of claim 10, further comprising displaying, on the display, a payment history regarding payment.

20. The mobile terminal of claim 6, wherein the controller is configured to receive an input to select one of the available information associated with payment.

21. The mobile terminal of claim 6, wherein the controller is configured to display, on the display, at least one optimum information associated with payment available for the current location.

22. The mobile terminal of claim 6, wherein the controller is configured to display, on the display, a discount rate of the information associated with payment.

23. The mobile terminal of claim 6, wherein the controller is configured to display, on the display, a window notifying entrance to the current location while the display is in the lock state, when the current location corresponds to the stored specific location, wherein the window is displayed at an area above the lock state indicator, and wherein the window notifying entrance includes an upper part and a lower part.

24. The mobile terminal of claim 6, wherein the information associated with payment includes at least one of a type of card, a credit limit, an available amount and a discount, and the controller is configured to display, on the display, at least one of the type of card, the credit limit, the available amount and the discount.

25. The mobile terminal of claim 6, wherein the controller is configured to display, on the display, a payment history regarding payment.

26. The mobile terminal of claim 1, wherein the second area of the display is above the first area of the display.

* * * * *